United States Patent [19]
Cone

[11] 3,874,025
[45] Apr. 1, 1975

[54] HINGE ARRANGEMENT FOR ARTICULATED WINDSHIELD WIPER BLADES

[75] Inventor: Irwin C. Cone, Littleton, Colo.

[73] Assignee: The Gates Rubber Company, Denver, Colo.

[22] Filed: June 18, 1973

[21] Appl. No.: 371,314

[52] U.S. Cl. .............................................. 15/250.42
[51] Int. Cl. .......................... B60s 1/02, B60s 1/38
[58] Field of Search....... 15/250.31, 250.32, 250.35, 15/250.36, 250.42

[56] References Cited
UNITED STATES PATENTS
2,649,605   8/1953   Scinta et al. ..................... 15/250.42
3,405,421   10/1968  Tomlin ............................. 15/250.42
3,659,309   5/1972   Besnard ........................... 15/250.32

FOREIGN PATENTS OR APPLICATIONS
1,920,035   10/1970  Germany ......................... 15/250.32

*Primary Examiner*—Peter Feldman
*Attorney, Agent, or Firm*—Curtis H. Castleman, Jr.; Raymond Fink; H. W. Oberg, Jr.

[57] ABSTRACT

A low silhouette windshield wiper assembly is described including an articulated pressure-distributing superstructure with an improved connection between the yokes of the superstructure. A non-circular hinge pin is used to conserve space without sacrificing load transmitting capability and, in conjunction with non-circular cross-sectioned apertures in the respective yokes, the ability to restrict the amount of rotation of the hinge is provided.

11 Claims, 4 Drawing Figures

PATENTED APR 1 1975 3,874,025

HINGE ARRANGEMENT FOR ARTICULATED WINDSHIELD WIPER BLADES

BACKGROUND OF THE INVENTION

This invention relates to windshield wiper blades and particularly to means for connecting yokes of an articulated pressure-distributing superstructure.

Tough weather resistant plastic materials such as polycarbonate have found increasing use in the superstructure of wiper blades. The plastic materials offer a number of advantages over traditionally used metals, for example the plastic superstructures don't rattle, reflect glare, or scratch windshields when the squeegee member deteriorates. Heretofore the plastic superstructures have generally comprised a primary and a pair of secondary leaf springs molded in a one-piece integral configuration. While this construction has been generally suitable, there have been drawbacks as well. A significant drawback has been the inability of the blade to conform to radically curved windshields due to the lack of sufficient flexibility at the end of the secondary leaf spring or yoke (which in turn is a result of the insufficient flexibility of the integral connection between the primary and secondary yokes).

Another drawback with the one-piece molded plastic superstructure has been the overall height of the blade. To reduce stress fatigue at the junction of the primary and secondary yokes, it has been necessary to include a raised connector portion, such as shown in Glynn, U.S. Pat. No. 3,176,337. This raised portion increases the height of the secondary yoke as well as the overall height of the assembly. With the advent of the use of recesses in the cowl of automobiles to hide the windshield wipers from view when in the parked position, it has become necessary to reduce the height of the blade at the secondary yoke as well as the overall height of the blade. For instance, to meet the specifications of most full size American automobiles the 16 inch size wiper blade must not exceed a maximum height of about ⅞ inch loaded, and must not exceed about ¾ inch loaded at the hinge point intersection of the primary and secondary yokes.

The present invention has for its primary object the provision of a low silhouette articulated windshield wiper assembly which overcomes the drawbacks of prior art windshield wiper blades. A further object is to provide an articulated superstructure in a windshield wiper assembly having a hinge arrangement which restricts the angle of relative rotation of the primary and secondary yokes. Another object is to provide a windshield wiper assembly which is very quiet in operation, is very flexible to permit conformance about acutely curved windshields, is inexpensive to manufacture, and is characterized by simplified assembly.

SUMMARY OF THE INVENTION

In one aspect, a low silhouette windshield wiper assembly is disclosed comprising a squeegee wiping element, a squeegee retaining backing member and an articulated pressure-distributing superstructure connected to the backing member. The superstructure includes at least two yokes segments, pivotally connected together by a hinge pin having a non-circular cross-section. The dimensions of the hinge pin taken together with the dimensions of aperturess in the primary and secondary yokes restricts the relative rotational angle through which the primary and secondary yokes may traverse about the hinge pin.

BRIEF DESCRIPTION OF THE DRAWINGS

Certain preferred embodiments of the invention will be described in reference to the accompanying drawings, in which.

PREFERRED EMBODIMENTS OF THE INVENTION

Figure 1:
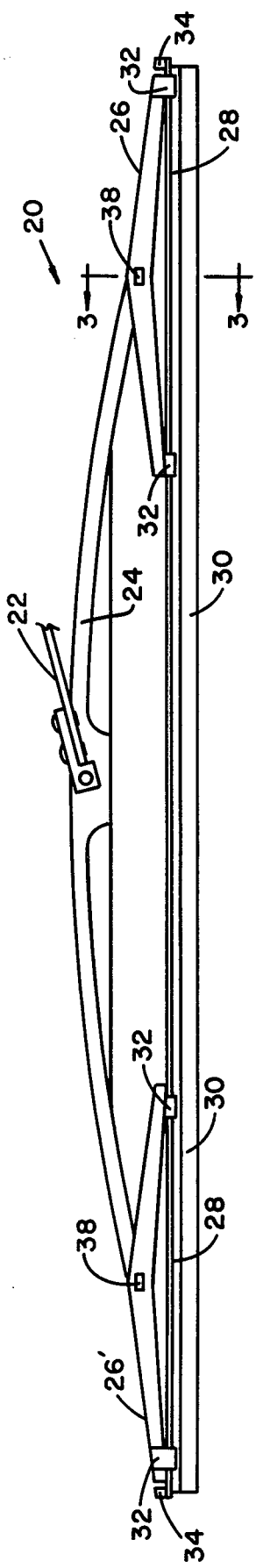
FIG. 1 is a side elevational view of a wiper blade according to the subject invention.

Referring to the drawings, a wiper assembly which may be used in conjunction with the windshield of an automobile, for instance, is generally designated at 20. An actuator arm (not shown) has its free end engagable with side arm attaching clip 22 which is pivotally mounted in known manner to the wiper assembly. In general, the wiper consists of a pressure-distributing articulated super-structure which may be of various configurations, exemplified by a pair of secondary yokes 26, 26' connected intermediate their respective ends to a primary yoke lever 24 which in turn carries the pivotal arm attaching clip 22 intermediate its ends. The wiper assembly is completed by a blade subassembly or refill comprised of a squeegee support backing strip 28 and a conventional elastomeric wiping element or squeegee 30 held by the backing strip.

Each secondary yoke 26, 26' contains two pairs of transversely aligned or staggered claws 32 which slidably connect the superstructure to the blade subassembly maintaining it in operative association. Normally an abutment member or pair of abutment members 34 are connected to the backing member to prevent disengagement of the superstructure from the backing strip.

According to the invention, a unique connection 36 is effected between the primary yoke lever 24 and secondary yoke lever 26, 26'. As shown, a substantially flat or rectangular cross-sectional hinge pin 38 interconnects the primary and secondary yokes through apertures 40, 42, and 40' transversely through the yoke members. With the aid of groove 43 in the inward top surface of the secondary yoke 26, the hinged yokes are able to nest for improved low profile; this feature is particularly useful as applied to plastic yokes which have lower modulus than metals.

To insure retension of the pin within the channel formed by side-by-side alignment of the apertures 40, 42, 40' it is desirable, for instance, to pre-deform one end 44 of the hinge member. After the hinge pin is inserted through the channel and the down-turned end 44 abuts against the yoke member, the opposite end of the hinge 48 may be bent downwardly to lock the connection. To facilitate obtaining the desired bend point, serrations 46 are formed in the hinge edges. Clearly, various alternatives could be utilized to accomplish retention of the hinge pin in operative locking association.

Figure 2:
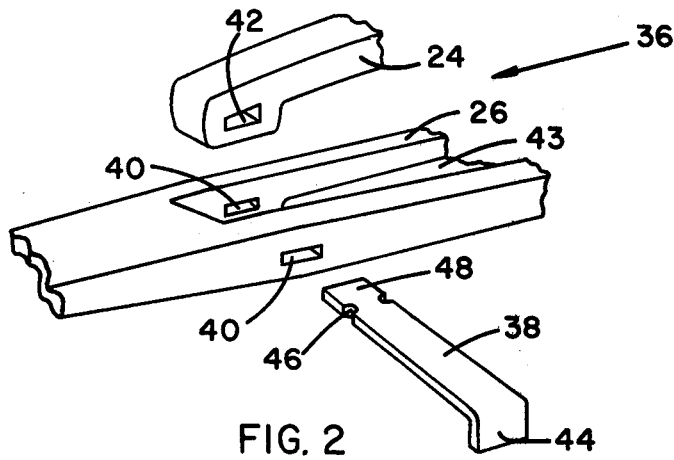
FIG. 2 is a detailed partial view of the connection between the primary and secondary yoke showing the individual elements prior to assembly thereof.
Figure 3:
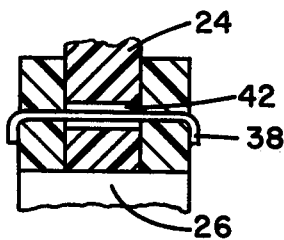
FIG. 3 is a truncated sectional view taken along section 3—3 of FIG. 1.

Either or both of the apertures in the secondary and primary yokes have a cross-section (lying in a plane longitudinal with the wiper assembly) which is non-circular and which permits the hinge pin 38 to fit loosely therein. As shown with reference to FIGS. 2 and 3, in one embodiment the hinge pin 38 fits snugly in each of the outer apertures 40, 40' of the secondary yoke while fitting loosely within the trapezoidal shaped aperture 42 of the primary yoke. The trapezoidal cross-section of aperture 42 permits the primary and secondary yokes to undergo relative angular rotation with respect to one another about the hinge as an axis, but angular deflection or rocking is restricted so that the primary yoke may be deflected upwardly only to a certain point. At that upper deflection point, the base of the aperture 42 abuts against the bottom of hinge 38. Clearly, the hinge member 38 could fit loosely in the apertures formed in the secondary yoke and snugly in the apertures formed in the primary yoke. Alternatively, each of the apertures in the primary and secondary yokes could be over-sized to such dimension that relative motion between the primary and secondary yokes would be permitted but only up to a certain relative angular deflection, the amount of deflection being selectively variable according to the clearance fit between the apertures and pins.

To permit the relative yet restricted pivotal deflection between the primary and secondary yokes at the connection, it is crucially important that the hinge pin 38 be non-circular in cross-section, coupled with the requirement that each of the apertures in the primary and secondary yokes are also of non-circular cross-section. In a preferred form, the apertures formed in the secondary yoke each individually have a cross-section which is substantially non-congruent with the cross-section of the apertures of the primary yoke.

The importance of preventing unlimited relative deflection between primary and secondary yokes, as would occur in the event a round pin were utilized, is evident when the motor vehicle owner attempts to free his windshield wiper when stuck to his windshield in icy conditions. When the user tries to break his wiper free from the windshield by pulling on the superstructure in a direction normal to the windshield, the primary yoke continues to deflect (and the squeegee may take on an acutely curved configuration) until eventually one of a number of things could occur: Hopefully the entire wiper is freed from the hold imposed by the ice; the stress imposed on the end abutment member 34 could (and often does) become so great that the abutment means is broken or released permitting disengagement of the superstructure from the blade; one or more of the links in the pressure-distributing superstructure or backing strip or squeegee can be broken, bent or torn, as the case may be; or in the case of some commerically available blades that have no abutment means at one end of the blade, continued deflection of the primary yoke upwardly and normal to the surface of the windshield results in separation and disengagement of the free end of the secondary yoke from the blade subassembly.

Figure 4:
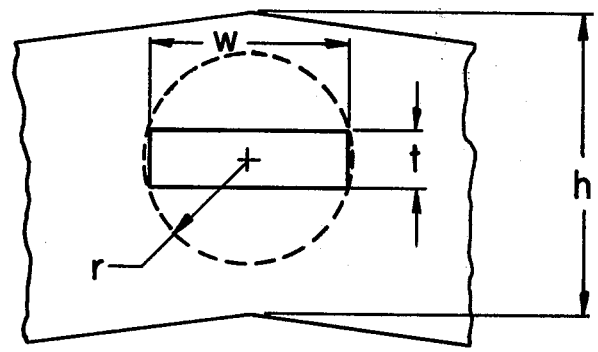
FIG. 4 is a partial view of the secondary yoke at the aperture connection.

Another important feature of the invention is the ability to minimize the overall height of the windshield wiper as well as the height of the secondary yoke in operation on a windshield surface as a result of using a non-circular hinge connection. Referring to FIG. 4 it is seen that considerable vertical space is conserved by utilizing a pin having a rectangular cross-section of width $w$ and thickness $t$, versus utilizing a round pin having an aperture diameter $2r$, where $2r$ is approximately the same as $w$. In this example, the amount of vertical space conserved by utilizing a flat pin as opposed to a round pin is approximately $2r-t$. This conserved space is very important when it is desired to produce a low silhouette blade which will fit in the narrow recesses provided in modern automobiles. Furthermore, by utilizing a flat pin one may increase the width of the pin without increasing its vertical thickness and thus distribute the load transmitted through the pin (from the primary yoke) without having to increase the thickness $h$ of the secondary yoke. In like manner, the width $w$ of the pin may be increased and simultaneously thickness $h$ of the secondary yoke reduced to the point where the thickness and mass of the secondary yoke is sufficient to preclude failure in bearing. As is known, the load carrying capability of a pinned connection is directly proportional to the product of the transverse length of the pin as it extends through the channeled apertures and the width of the pin.

Another advantage of using a flat pin versus a round pin is to minimize abrasion between the pin and channel. This abrasive action normally causes enlargening of the hole, sloppiness in fit and reduction in performance. This is to be contrasted with the non-abrasive rocking motion of the flat pin.

While the foregoing description has particular utility for interconnecting molded plastic yokes together with a hinged pin of high modulus material, e.g. metal, it will be understood that the invention also has application in hinging together metal segments. In any of the cases, the hinge member 38 may alternatively be made of a sturdy piece of plastic which is thrust through the channel formed by the aligned apertures, and then could be heat formed at the ends of the pin in a manner to preclude disengagement of the pin from the channel.

It should be understood that the invention is capable of a variety of other modifications and variations which will become apparent to those skilled in the art upon a reading of the specification. Such modifications are intended to be encompassed within the scope of the invention as defined by the appended claims.

What is claimed is:

1. A windshield wiper blade assembly comprising an elongate flexible squeegee wiper blade, an elongate squeegee retention member and an articulated pressure-distributing superstructure slidably attached to the retention member, said superstructure comprising a primary yoke having a transversely disposed aperture near each of its ends and a pair of secondary yokes each having a transversely disposed aperture intermediate their respective ends, the primary yoke pivotally connected at each of its ends to one of the secondary yokes by a separate hinge member having marginal end portions and an essentially horizontally disposed body portion having a non-circular cross-section and extending through a channel defined by side-by-side alignment of the respective apertures of the primary and one of the secondary yokes, said channel so dimensioned as to restrict the angle of relative rotation of the primary and secondary yokes about the hinge members, said hinge member having a length greater than that of the channel so that the marginal end portions extend beyond the channel, said end portions being turned so as to individually extend in a direction substantially normal to the body portion for locking pivotal engagement of the hinge member with the yokes.

2. The wiper assembly of claim 1 wherein the at least one of the yoke members at a position inward of the hinge connection has a grooved surface nestable with the yoke member with which it is in connection.

3. The wiper blade assembly of claim 1 wherein the hinge member is of substantially rectangular cross-section.

4. The wiper blade assembly of claim 1 wherein either or both of the apertures in the secondary and primary yokes have a cross-section which permits the hinge member to fit loosely in such apertures.

5. The wiper blade assembly of claim 4 wherein each secondary yoke has a pair of aligned outer apertures, the hinge member fitting snugly in each of these outer apertures while fitting loosely within the aperture formed in the primary yoke.

6. The wiper blade assembly of claim 4 wherein each of the secondary yokes has a pair of aligned outer apertures formed therein, the hinge member fitting loosely in such outer apertures and snugly within the aperture formed in the primary yoke.

7. A low silhouette windshield wiper assembly comprising a squeegee wiping element, a squeegee retaining backing member and an articulated pressure-distributing superstructure connected to the backing member, said superstructure comprising a molded unitary plastic primary yoke having a transversely disposed aperture in at least one end thereof, and at least one molded unitary plastic secondary yoke having a pair of transversely disposed apertures intermediate the respective ends of the secondary yoke, the primary yoke pivotally connected to the secondary yoke by a hinge member through a channel defined by side-by-side alignment of the respective apertures of the primary and secondary yokes, said secondary yoke having inward of the hinge connection an upper-grooved surface nestable with the primary yoke for an improved low profile configuration.

8. A low silhouette windshield wiper blade assembly comprising an elongate elastomeric squeegee wiping element, an elongate squeegee-retaining backing member and a pressure-distributing suuperstructure slidably connected to the backing member at spaced points therealong, said superstructure comprising:

a molded plastic primary yoke member having an aperture non-circular in cross-section disposed transversely through the yoke near each of its end extremities;

a pair of molded plastic secondary yokes each having intermediate its ends an aperture non-circular in cross-section disposed transversely through the yoke;

said secondary yoke apertures each individually having a cross-section which is non-congruent with the cross-section of the apertures of the primary yoke; and a non-circular hinge member of high modulus material pivotally connecting each of said secondary yokes with the respective ends of the primary yoke through a non-uniform cross-sectioned channel defined by alignment of the respective apertures of the primary yoke individually with each of the secondary yokes, said channel so dimensioned as to restrict the angle of relative rotation of the primary and secondary yokes about the hinge members.

9. The wiper blade assembly of claim 8 wherein said hinge members are substantially flat, generally horizontally disposed, and have a length greater than the channel, the ends of the flat hinge being down-turned to lock the hinge in place.

10. The windshield wiper blade assembly of claim 8 wherein said secondary yoke inward of the hinge connection has an upper-grooved surface nestable with the primary yoke for improved low profile.

11. The windshield wiper blade assembly of claim 9 wherein the flat hinge members has spaced from one end thereof means formed in the hinge member for obtaining the desired bend point of the hinge member to facilitate retention of the hinge member in operative locking association with the yoke members.

* * * * *